United States Patent
Liu et al.

(10) Patent No.: US 9,652,844 B2
(45) Date of Patent: *May 16, 2017

(54) METHOD AND APPARATUS FOR AUTOMATIC CANCER DIAGNOSIS SCORING OF TISSUE SAMPLES

(71) Applicant: Sony Corporation, Tokyo (JP)

(72) Inventors: Ming-Chang Liu, San Jose, CA (US); Ximin Zhang, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,641

(22) Filed: Mar. 18, 2015

(65) Prior Publication Data

US 2016/0189370 A1 Jun. 30, 2016

Related U.S. Application Data

(63) Continuation of application No. 13/659,438, filed on Oct. 24, 2012, now Pat. No. 9,020,221.

(51) Int. Cl.
  *G06K 9/00* (2006.01)
  *G06T 7/00* (2017.01)
  *G06K 9/52* (2006.01)
  *G06K 9/46* (2006.01)

(52) U.S. Cl.
  CPC .......... *G06T 7/0012* (2013.01); *G06K 9/0014* (2013.01); *G06K 9/00127* (2013.01); *G06K 9/4671* (2013.01); *G06K 9/52* (2013.01); *G06K 2209/05* (2013.01); *G06T 2207/10024* (2013.01); *G06T 2207/10056* (2013.01); *G06T 2207/30024* (2013.01); *G06T 2207/30096* (2013.01)

(58) Field of Classification Search
  USPC ................ 382/128–134, 192–194, 221, 271
  See application file for complete search history.

(56) References Cited

U.S. PATENT DOCUMENTS

| | | | | |
|---|---|---|---|---|
| 5,830,141 A | * | 11/1998 | Makram-Ebeid | G06T 7/0012 378/62 |
| 6,667,177 B1 | * | 12/2003 | Yabusaki | G01N 1/30 382/133 |
| 9,020,221 B2 | * | 4/2015 | Liu | G06K 9/00127 382/128 |
| 2002/0031277 A1 | * | 3/2002 | Lubin | G06T 5/50 382/254 |
| 2002/0076092 A1 | * | 6/2002 | Ellis | G06K 9/00127 382/133 |
| 2004/0058401 A1 | * | 3/2004 | Bossy | G01N 33/54326 435/7.23 |
| 2004/0120562 A1 | * | 6/2004 | Hays | G01N 1/312 382/128 |
| 2005/0136549 A1 | * | 6/2005 | Gholap | G06K 9/0014 436/501 |

(Continued)

*Primary Examiner* — Alex Liew
(74) *Attorney, Agent, or Firm* — Trellis IP Law Group, PC

(57) ABSTRACT

Certain aspects of an apparatus and method for automatic ER/PR scoring of tissue samples may include for determining a cancer diagnosis score comprising identifying a positive stained nucleus in a slide image of the tissue sample, identifying a negative stained nucleus in the slide image, computing a proportion score based on number of the positive stained nucleus identified and number of the negative stained nucleus identified and determining the cancer diagnosis score based on the proportion.

19 Claims, 10 Drawing Sheets

(56) References Cited

U.S. PATENT DOCUMENTS

| | | | | |
|---|---|---|---|---|
| 2010/0290692 A1* | 11/2010 | Macaulay | ............ | G06T 7/0012 |
| | | | | 382/133 |
| 2014/0112568 A1* | 4/2014 | Liu | ...................... | G06K 9/0014 |
| | | | | 382/133 |
| 2014/0112569 A1* | 4/2014 | Liu | .................... | G06K 9/00127 |
| | | | | 382/133 |

* cited by examiner

METHOD AND APPARATUS FOR AUTOMATIC CANCER DIAGNOSIS SCORING OF TISSUE SAMPLES

CROSS-REFERENCE TO RELATED APPLICATIONS/INCORPORATION BY REFERENCE

This application is a continuation of co-pending U.S. patent application Ser. No. 13/659,438, filed Oct. 24, 2012, which is incorporated herein by reference in its entirety. This application makes reference to commonly assigned and co-pending U.S. patent application Ser. No. 13/549,019 filed on Jul. 13, 2012.

Each of the above referenced applications are hereby incorporated herein by reference in their entireties.

FIELD

Certain embodiments of the invention relate to identifying cancer through digital pathology. More specifically, certain embodiments of the invention relate to a method and apparatus for automatic cancer diagnosis scoring of tissue samples.

BACKGROUND

In the area of biology and medicine, understanding cells and their supporting structures in tissues, tracking their structure and distribution changes are very important. Histology, the study of the microscopic anatomy of tissues, is essential in disease diagnosis, medicinal development and many other fields. In histology, the process of examining a thin slice of tissue sample under a light microscope or electron microscope is generally performed. In order to visualize and differentiate various microscopic biological substances, one common approach is to stain the tissue sample with a combination of several dyes that have selective responses to the presence of different biological substances. In doing so, specified biological substances such as nuclei, cytoplasm, membranes, disease markers, specific proteins and other structures, are visually enhanced, thereby facilitating detection and localization of these microscopic biological substances. In many instances diseased tissues present specific anatomical and physiological alterations that can be detected using histological analysis.

Various cancer cells contain proteins or other biomolecules that are either absent or expressed at a different level in normal tissue. Such proteins or biomolecules are referred to as cancer markers. Cancer markers are typically used for diagnosis and/or targeted therapy. For example, estrogen receptors (ER) and progesterone receptors (PR) are generally accepted as markers for breast cancer. In many instances, tests for receptor status, such as status of estrogen receptors (ER) and progesterone receptors (PR) of breast cancer tissue is performed for identifying an effective chemotherapy regimen. The receptor status may be determined using an immunohistochemistry (IHC) staining process that involves use of receptor specific stains to stain cancer cells so as to aid in their visualization.

ER or PR IHC test results are represented by an ER/PR "score". Currently, the process of generating an ER/PR "score" is often based on the manual visual analysis of an examining pathologist. Current automatic scoring techniques provide inconsistent results due to improper identification of stained cancer cells. Further, the process is time consuming and results are often inconsistent.

Therefore there is a need in the art for an efficient method and apparatus for identification of stained cancer cells in automatic ER/PR scoring of tissue samples.

Further limitations and disadvantages of conventional and traditional approaches will become apparent to one of skill in the art, through comparison of such systems with some aspects of the present invention as set forth in the remainder of the present application and with reference to the drawings.

SUMMARY

An apparatus and method is provided for automatic estrogen receptor or progesterone receptor (ER/PR) scoring of tissue samples substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION

Embodiments of the invention relate to an apparatus and/or method for automatic cancer diagnosis scoring of tissue samples. According to one embodiment, a salient region is selected from an input slide containing tissue samples stained with red and blue dyes, where the salient region is based on either user input or algorithmic selection, to find the region which is rich in both the red and blue channels of the image. Stain vectors of the salient region are calculated. Additionally, Optical Domain transformations are applied to a user-selected interest area in the input slide, and then stain separation is performed on the transformed area into a positive stain image and a negative stain image. The stain intensity of pixels of the positive stain image and the negative stain image are each analyzed to determine a pixel count for each stain image, which pixel counts are used for obtaining a size range parameter An average intensity of the positive stain is determined using the positive stain image. Positive stained nuclei in the positive stain image are identified using the size range parameter and the average intensity of the positive stain. Negative stained nuclei in the negative stain image are identified using the size range parameter. A total number of identified nuclei is computed by summing the number of identified positive stained nuclei and the number of identified negative stained nuclei. A proportion score (PS) is computed based on the percentage of identified positive stained nuclei compared to the total number of identified nuclei, and an intensity score (IS) is obtained based on the average intensity of the identified positive stained nuclei. The final ER/PR score is computed by summing the PS and IS scores.

Figure 1:
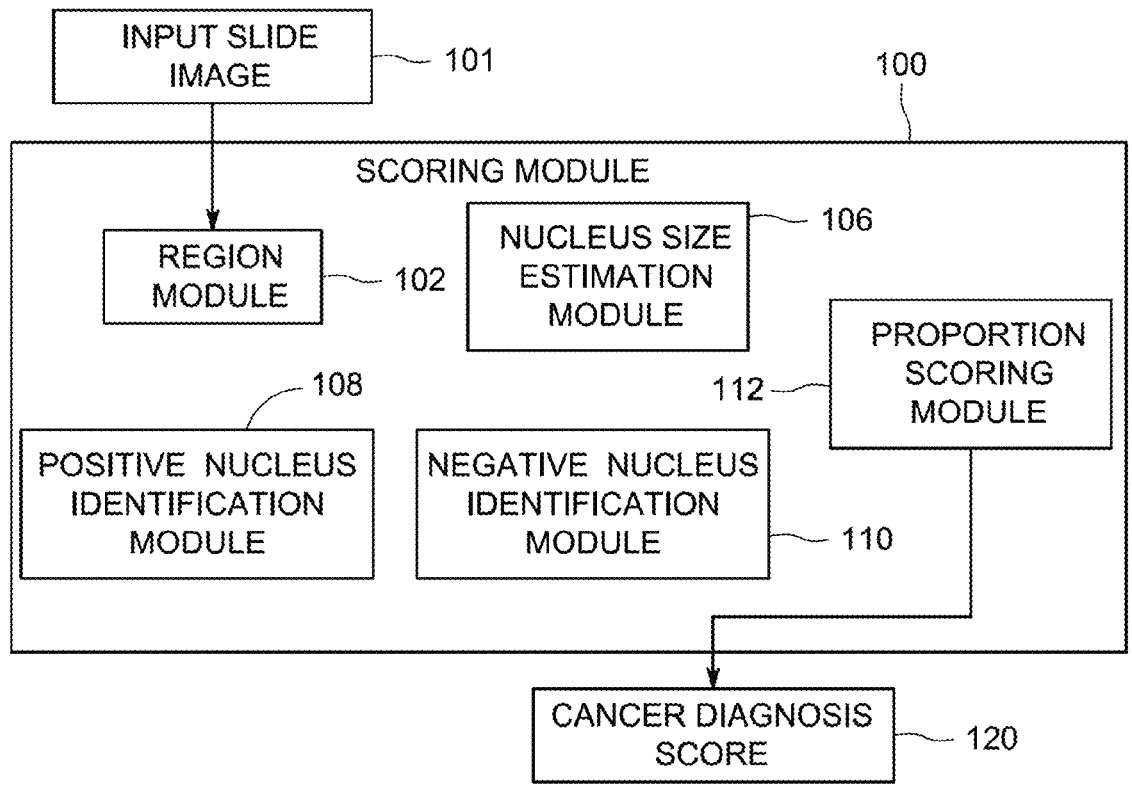
FIG. 1 is a block diagram illustrating a cancer diagnosis scoring module, in accordance with an exemplary embodiment of the present invention.

FIG. 1 is a block diagram illustrating an estrogen receptor or progesterone receptor (ER/PR) scoring module 100, in accordance with an embodiment of the invention. The ER/PR scoring module 100 comprises a region module 102, a nucleus size estimation module 106, a positive nucleus identification module 108, a negative nucleus identification module 110 and a proportion scoring module 112. The scoring module 100 takes an input digital slide image 101 as an input. According to one embodiment, the scoring module 100 is directly coupled to an electron microscope (not shown), or other device through which slides of tissue samples are viewed and the digital slide image 101 is generated.

Figure 2:
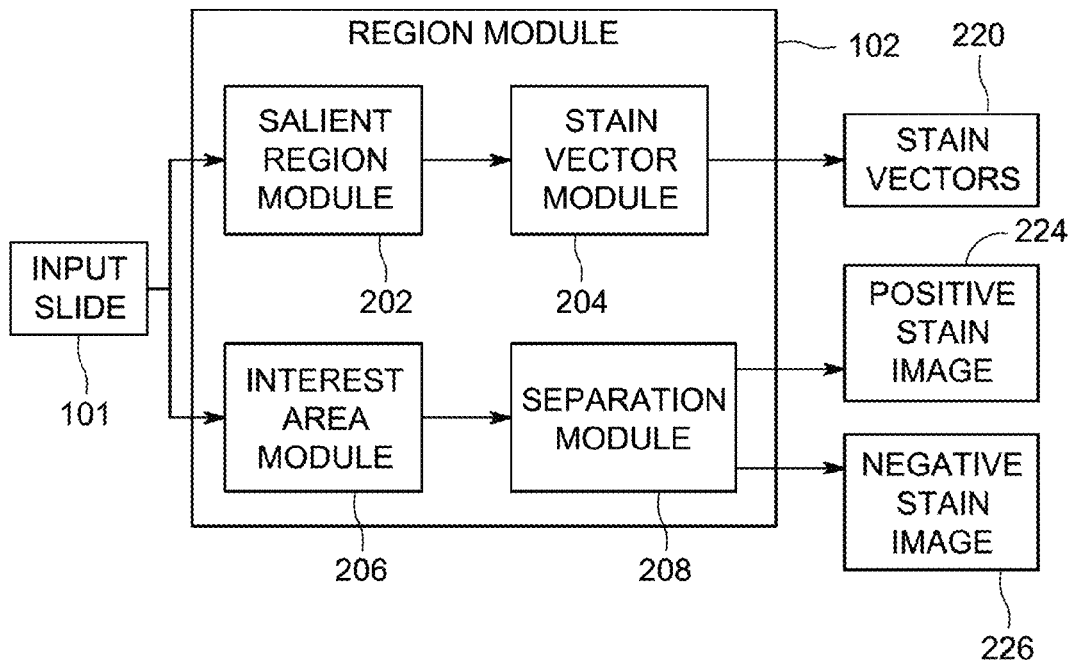
FIG. 2 is a functional block diagram of a region module in accordance with exemplary embodiments of the present invention.

FIG. 2 is a functional block diagram of the region module 102 in accordance with exemplary embodiments of the present invention. The region module 102 comprises a salient region module 202, a stain vector module 204, an interest area module 206 and a separation module 208. According to one embodiment, the ER/PR scoring module 100 of FIG. 1 passes the input slide image 101 to the salient region module 202 and the interest area module 206 in parallel.

The salient region module 202 is coupled to the stain vector module 204. The salient region module 202 analyzes the input slide image 101 and determines that a particular region of the slide image 101 is a salient region for analysis. According to one embodiment, saliency is determined by an automated color analysis technique that finds the region of the input image 101 that is rich in both red and blue channels. Richness of a particular color is indicated by the amount of pixels appearing in that particular color, such as red, and the intensity in the red channel will be higher than other channels. Richness in the blue channel is indicated by there being many pixels appearing to be blue, and the intensity in the blue channel of the image 101 will be higher than other channels. In some embodiments, if the input slide image 101 is determined to be smaller than a threshold size, the entire image is determined to be a salient region. The stain vector module 204 takes the salient region as input and calculates stain vectors 220 of the region, as disclosed in commonly assigned related pending U.S. patent application Ser. No. 13/549,019. Further details of that particular process are not needed to understand the present invention and therefore, in the interest of clarity, are not provided.

In parallel, the interest area module 206 extracts a user interest area from the input slide image 101. The image 101 is transformed from a red/green/blue (RGB) domain to an optical domain as described in commonly assigned copending U.S. patent application Ser. No. 13/549,019. The separation module 208 takes the optical domain image as input and separates the optical domain image into a positive stain image 224 and a negative stain image 226. According to some embodiments, the positive stain image 224 provides positive stain acquired by the image slide and the negative stain image 226 provides negative stain acquired by the image slide.

Figure 3:
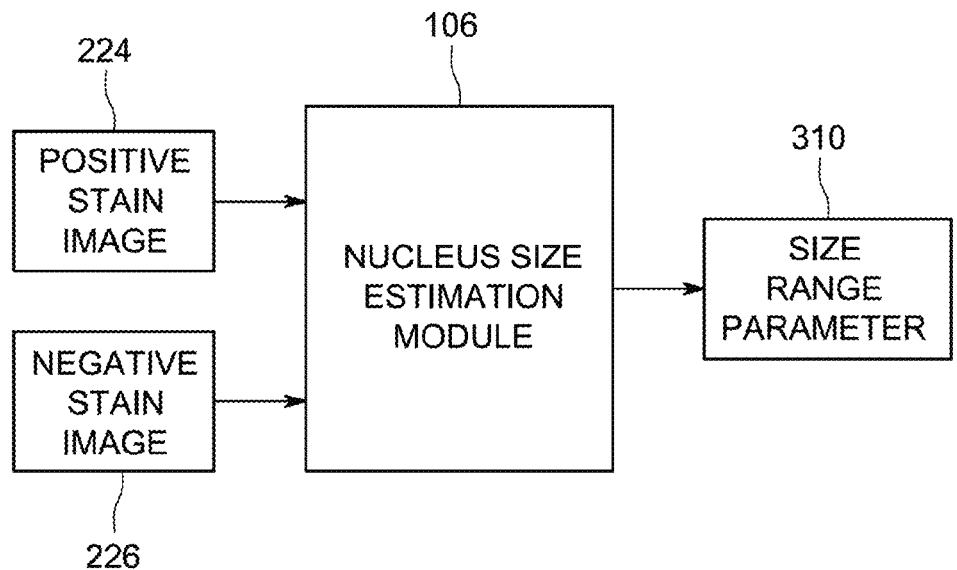
FIG. 3 is a functional block diagram of a nucleus size estimation module in accordance with exemplary embodiments of the present invention.

FIG. 3 is a functional block diagram of the nucleus size estimation module 106 (NSEM) in accordance with exemplary embodiments of the present invention. The NSEM 106 takes the positive stain image 224 and the negative stain image 226 as input. According to some embodiments, the NSEM 106 counts negative stained pixels in the negative stain image 226 and positive stained pixels in the positive stain image 224 respectively to obtain a size range parameter 310 based on a ratio of the counted number of positive stained pixels to the counted number of negative stained pixels. The size of a stained nucleus differentiates the nucleus from other objects in the stained image. According to some embodiments, the size range parameter is generally larger than then nucleus.

Figure 4:
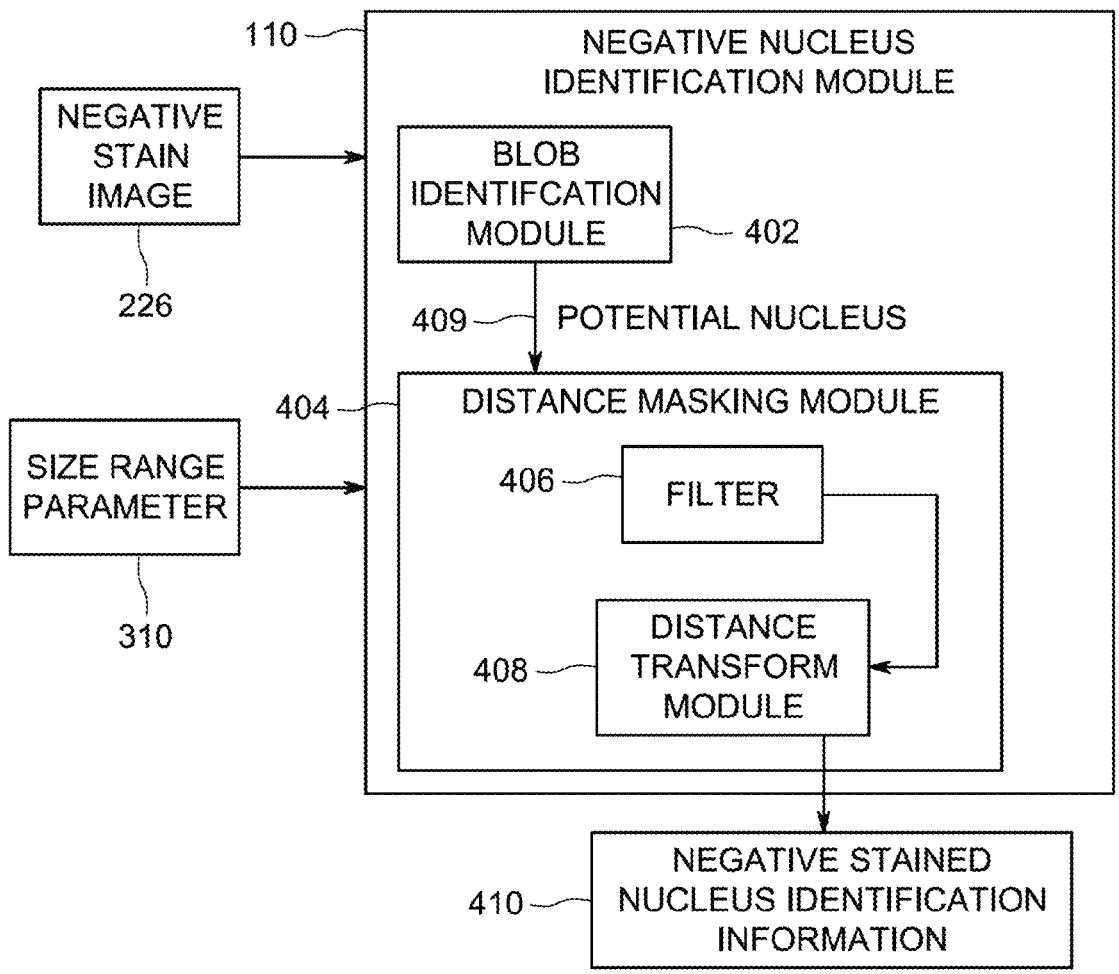
FIG. 4 is a functional block diagram of a negative nucleus identification module in accordance with exemplary embodiments of the present invention.

FIG. 4 is a functional block diagram of the negative nucleus identification module 110 in accordance with exemplary embodiments of the present invention. The NNIM 110 comprises a blob identification module 402 and a distance masking module 404. The distance masking module 404 further comprises a filter 406 and a transform module 408. The NNIM 110 receives as input the negative stain image 226 from the region module 102 of FIG. 1 as well as, in some embodiments, the size range parameter 310, and outputs negative stained nucleus identification information 410.

According to an exemplary embodiment, the blob identification module 402 applies a window averaging procedure to the intensity level of each pixel P of the negative stain image 226 according to the following expression:

$$\overline{P(i,j)} = \frac{1}{S \times S} \sum_{i=1}^{S} \sum_{j=1}^{S} P\left(i - \frac{S}{2}, j - \frac{S}{2}\right)$$

where S is the length of the window and "I" and "j" iterate over length S. According to some embodiments S is obtained as the size range parameter 310 from the NSEM 106. After all pixels of the negative stain image 226 are processed, an image inverse process is performed on each pixel P, as follows:

$$\overline{P(i,j)} = 255 - \overline{P(i,j)}$$

After the inversion, each pixel of the negative stain image 226 is compared to a negative nucleus threshold value to determine if the current pixel is a potential negative stained nucleus center. If the pixel value is greater than the negative nucleus threshold, the current pixel is identified as a potential negative stained nucleus center at output 409; otherwise, the pixel is excluded as a potential negative stained nucleus center.

A low-pass filter, i.e. the filter 406, is applied to the negative stain image 226 received as an input to the distance masking module 404. The filter 406 removes noise from the negative stain image 226, and subsequently a binary image generation process is applied to each pixel of the low-pass filtered image according to the following formula to generate a binary image at output 411:

$$B(i,j) = \begin{cases} 1 & \text{if } P(i,j) < T1 \\ 0 & \text{if } P(i,j) \geq T1 \end{cases}$$

where T1 is a threshold value that determines if a current pixel has strong enough negative stain to be qualified as a potential negative stained nuclei pixel. The lower the value of the pixel, the stronger the negative stain is.

The transform module 408 receives as an input the binary image B(i,j) from output 411 and applies a distance transform thereto to calculate the minimum distance of each white pixel (value of 1) to any black pixel (value of 0). Once the distance transform is complete, a distance image is generated using the distance value as the pixel value. The distance masking module 404 also receives as an input, from output 409 of the blob identification module 402, pixels of the negative stained image 226 identified as the potential negative stained nucleus centers. For each potential negative stained nucleus center pixel identified in the blob identification module 402, the corresponding distance value in the same location of the distance image is added onto the potential negative stained nucleus center pixel to generate a new image according to the following equation:

$$P_{new}(i,j) = \begin{cases} \overline{P(i,j)} + D(i,j) & \text{if } \overline{P(i,j)} \text{ is a potential nucleus center} \\ 0 & \text{Otherwise} \end{cases}$$

Each pixel in the newly generated image is compared to its neighbors and the local maximum pixel is identified as a negative stained nucleus center. The S×S area surrounding it is identified as the negative stained nucleus area and output as negative stained nucleus identification information 410.

Figure 5:
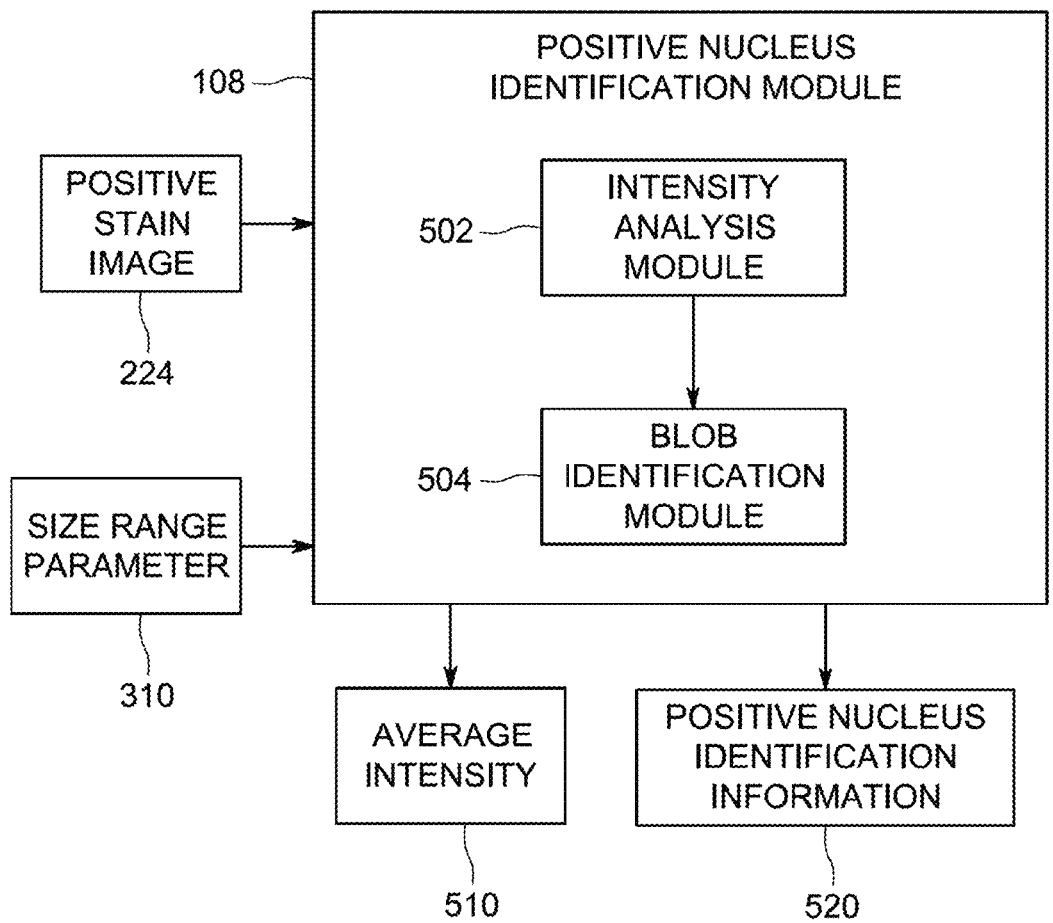
FIG. 5 is a functional block diagram of a positive nucleus identification module in accordance with exemplary embodiments of the present invention.

FIG. 5 is a functional block diagram of the positive nucleus identification module (PNIM) 108 of FIG. 1 in accordance with exemplary embodiments of the present invention. The PNIM 108 comprises an intensity analysis module 502 and a blob identification module 504. The PNIM 108 receives the positive stain image 224 from the region module 102 as input, and outputs the average intensity 510 of positive stain in the positive stain image 224 and positive stained nucleus identification information 520 is identified.

According to an exemplary embodiment, the intensity analysis module 502 calculates the average intensity 510 according to the following expression:

$$Average_{intensity} = \frac{1}{M} \sum_{P(i,j)<T2} P(i,j)$$

where M is total number of pixels that satisfy the condition: P(i, j)<T2 where T2 is a predetermined threshold value. For example, in one embodiment, T2 is 200.

The blob identification module 504 applies a window averaging procedure to each pixel of the positive stain image 224 according to the following expression:

$$\overline{P(i,j)} = \frac{1}{S \times S} \sum_{i=1}^{S} \sum_{j=1}^{S} P\left(i - \frac{S}{2}, j - \frac{S}{2}\right)$$

where S is the length of the window. According to some embodiments S is obtained as the size range parameter 310 from the NSEM 106. After all pixels of the positive stain image 224 are processed, an image inverse process is performed:

$$\overline{P(i,j)} = 255 - \overline{P(i,j)}$$

After the inversion, each pixel of the positive stain image 224 is compared to a content adaptive positive nucleus threshold value T3 to determine if the current pixel is a potential positive stained nucleus center. If the pixel value is greater than the positive nucleus threshold, the current pixel is identified as a potential positive stained nucleus center; otherwise, the pixel is excluded as a potential positive stained nucleus center.

According to some embodiments the content adaptive positive nucleus threshold T3 is based on the average intensity 510 and is computed according to the following expression:

$$T3 = C \times (255 - Average_{intensity})$$

where T3 is the positive nucleus threshold and C is a constant parameter. For example, C may be 20. The local maximum pixel is identified as a positive stained nucleus center. The S×S area surrounding it is identified as the positive stained nucleus area and output as positive stained nucleus identification information 520.

Figure 6:
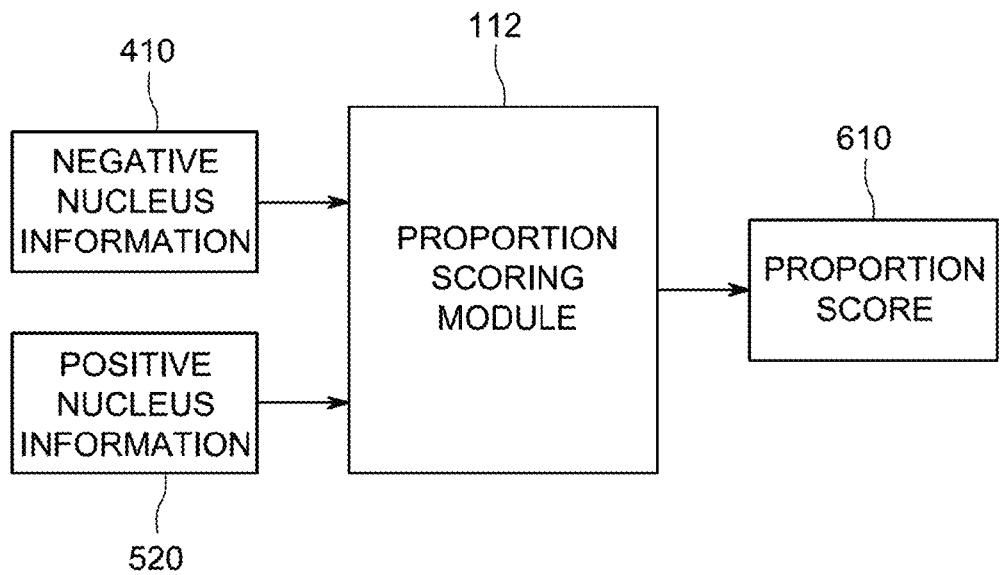
FIG. 6 is a functional block diagram of a proportion score module in accordance with exemplary embodiments of the present invention.

FIG. 6 is a functional block diagram of a proportion score (PS) module 112 in accordance with exemplary embodiments of the present invention. The PS module 112 takes as input the negative nucleus identification information 410 and the positive nucleus identification information 520 from the NNIM 110 and the PNIM 108 respectively. According to some embodiments, the PS module 112 computes the number of negative stained nucleus identified in the negative stain image 226 according to the negative nucleus identification information 410 and the number of positive stained nucleus identified in the positive stain image 224 according to the positive nucleus identification information 520.

According to some embodiments, the PS module 112 computes a total nuclei count by summing number of the positive stained nucleus identified and the negative stained nucleus identified. Further the PS module 112 computes a positive stained nuclei percentage as a proportion score 610 based on number of the positive stained nucleus identified and the total nuclei count.

Figure 7:
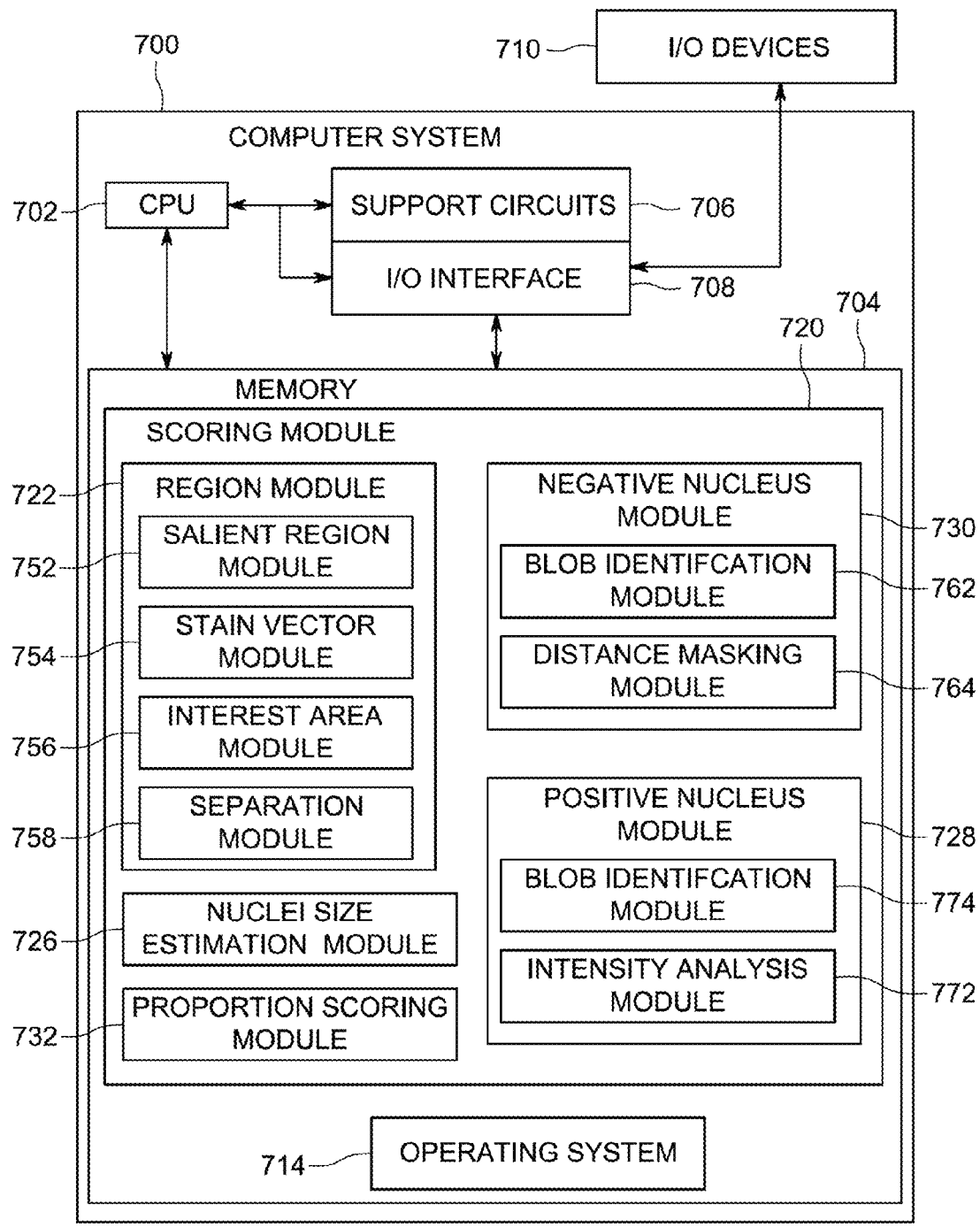
FIG. 7 is a block diagram of a computer system for implementing the scoring module in accordance with embodiments of the present invention.

FIG. 7 is a block diagram of a computer system 700 for implementing the scoring module 100 of FIG. 1 in accordance with embodiments of the present invention. The system 700 includes a processor 702, a memory 704 and various support circuits 706. The processor (i.e. CPU) 702 may include one or more microprocessors known in the art, and/or dedicated function processors such as field programmable gate arrays programmed to perform dedicated processing functions. The support circuits 706 for the processor 702 include microcontrollers, application specific integrated circuits (ASIC), cache, power supplies, clock circuits, data registers, input/output (I/O) interface 708, and the like. The I/O interface 708 may be directly coupled to the memory 704 or coupled through the supporting circuits 706. The I/O interface 708 may also be configured for communication with input devices and/or output devices 710, such as, network devices, various storage devices, mouse, keyboard, displays, sensors and the like.

The memory 704 stores non-transient processor-executable instructions and/or data that may be executed by and/or used by the processor 702. These processor-executable instructions may comprise firmware, software, and the like, or some combination thereof. Modules having processor-executable instructions that are stored in the memory 704 comprise the scoring module 720, further comprising the region module 722, the nucleus size estimation module 726, the positive nucleus identification module (PNIM) 728, the negative nucleus identification (NNIM) 730 and a proportion scoring module 732.

The computer 700 may be programmed with one or more operating systems (generally referred to as operating system (OS) 714, which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 714 may be disposed in the memory 704. In an exemplary embodiment, the memory 704 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

The region module 722 further comprises the salient region module 752, the stain vector module 754, the interest area module 756 and the separation module 758. The negative nucleus identification module 730 further comprises the blob identification module 762 and the distance masking module 764. The positive nucleus identification module 728 further comprises the intensity analysis module 772 and the blob identification module 774.

Figure 8:
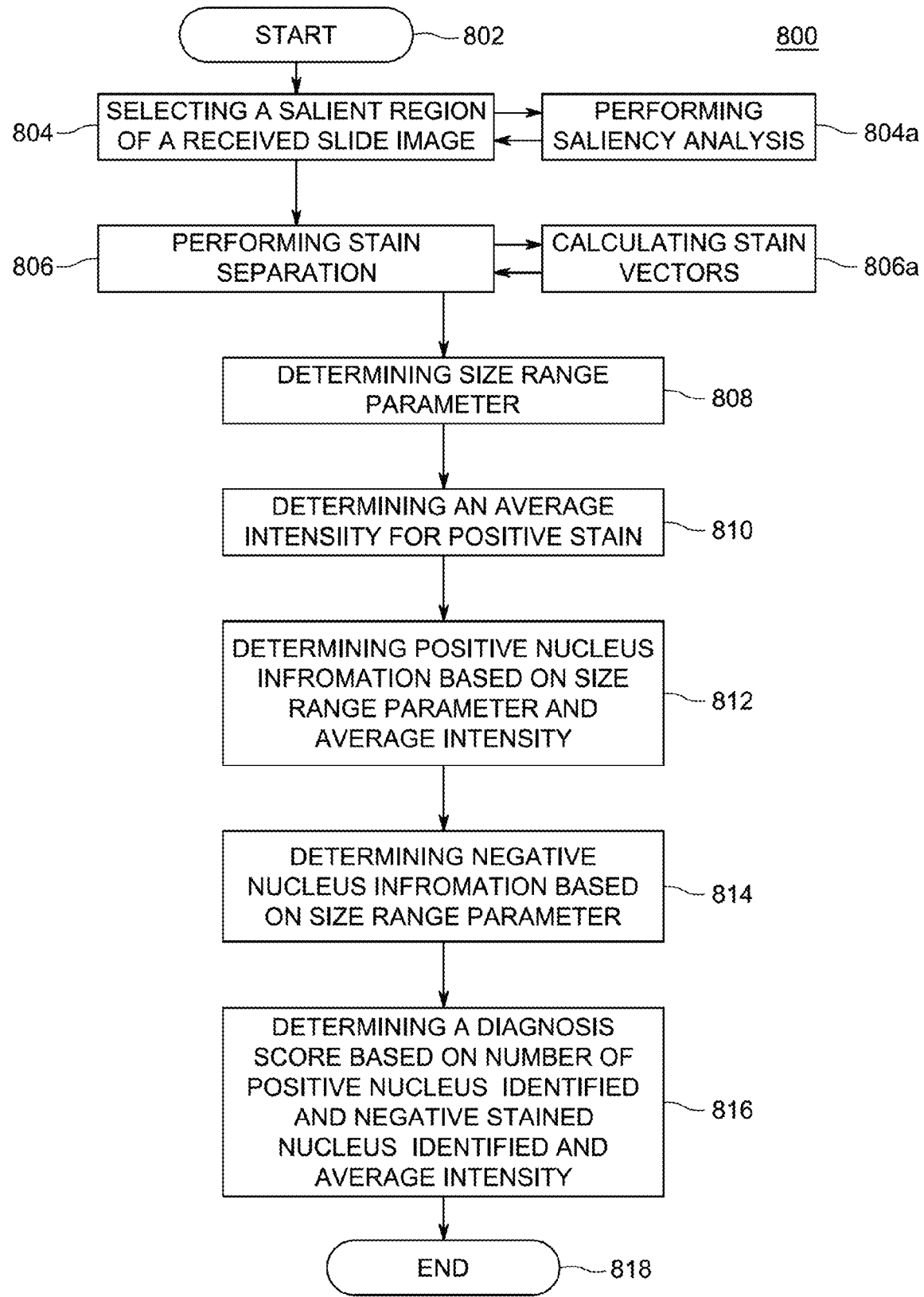
FIG. 8 is an illustration of a flow diagram for a method for determining a diagnosis score according to exemplary embodiments of the present invention.

FIG. 8 is an illustration of a flow diagram for a method 800 for determining a diagnosis score according to exemplary embodiments of the present invention. The method 800 is an implementation of the scoring module 100 shown in FIG. 1, executed as scoring module 720 by the processor 702. The method begins at step 802 and proceeds to step 804.

At step 804, the salient region module 202 identifies the salient regions of an input image (e.g., an input slide image of a stained tissue sample). Within step 804, the method 800 performs step 804a, wherein saliency analysis is applied to the slide image, which determines the saliency of a region based on the existence of red and blue channels in a stain.

The method then proceeds to step 806, where stain separation is performed on the salient region by the separation module 208. Stain separation is performed in step 806a, where stain vectors are calculated for the stains. At step 808, the size range parameter 310 is determined by the NSEM 106 using the positive stain image 224 and the negative stain image 226. At step 810, the average intensity 510 of positive stain in the positive stain image 226 is determined by the average intensity module 502.

At step 812, positive stained nuclei information is determined by the PNIM 728 using the average intensity 510 and the size range parameter 310. At step 814, negative stained nuclei information is determined by the NNIM 730 using the size range parameter 310 and distance masking as described in conjunction with FIG. 4. At step 816, scoring module 720 determines a cancer diagnosis score based on number of negative stained nucleus identified, number of positive stained nucleus identified and the average intensity. The method 800 then ends at step 818.

According to some embodiments the scoring module 720 provides an ER/PR score based on the scoring guideline provided by the American Society of Clinical Oncology and the College of American Pathologists as described in detail below with reference to FIG. 13.

Figure 9:
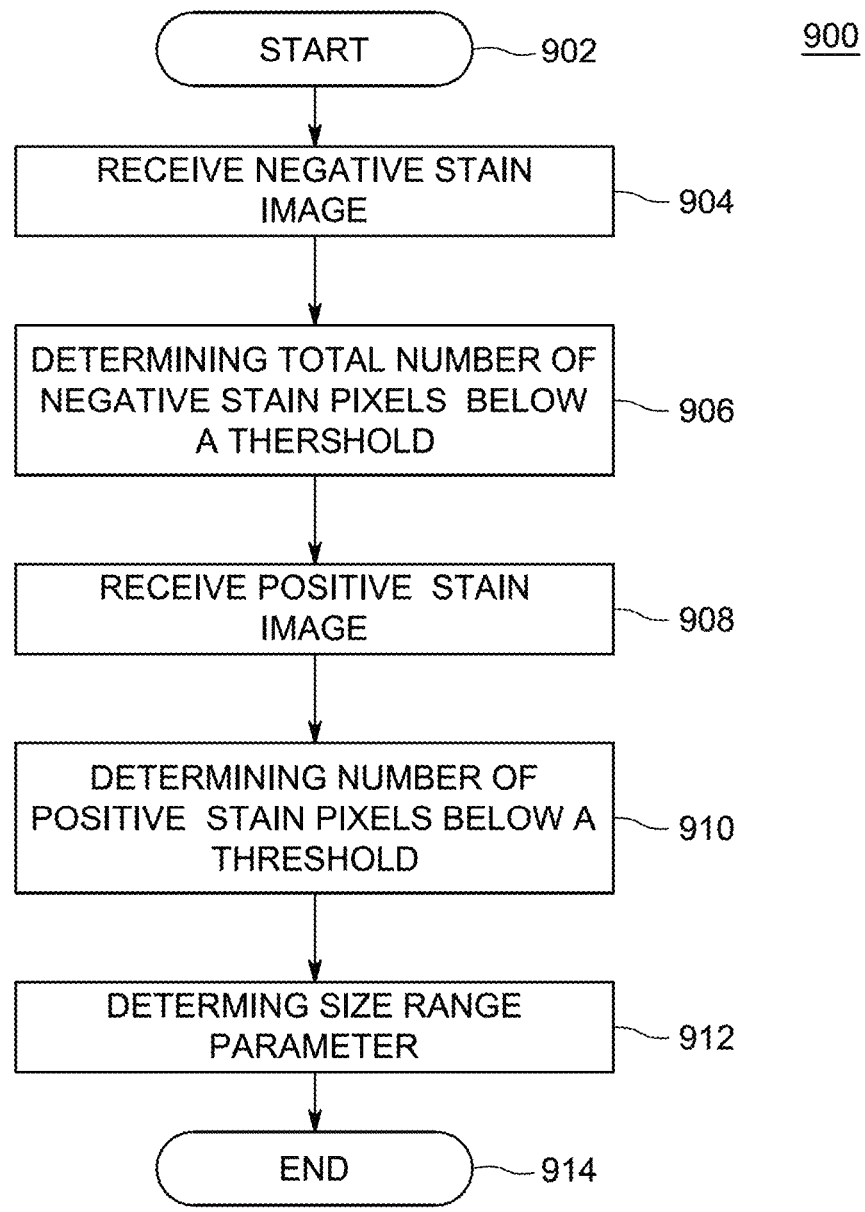
FIG. 9 is an illustration of a flow diagram for a method for estimating nucleus size according to exemplary embodiments of the present invention.

FIG. 9 is an illustration of a flow diagram for a method 900 for estimating nucleus size according to exemplary embodiments of the present invention. The method 900 is an implementation of the nucleus size estimation module (NSEM) 106 shown in FIG. 1, implemented as the NSEM 726 in FIG. 7 as executed by the processor 702. The method 900 begins at step 902 and proceeds to step 904.

At step 904, the negative stain image 226 is taken by the NSEM 106 as input. At step 906, determination of total number of negative stained pixels below a predetermined negative threshold in the negative stain image 226 is performed by the NSEM 726. At step 908, the positive stain image 224 is taken by the NSEM 726 as input. At step 910, determination of total number of positive stained pixels below a predetermined positive threshold in the positive stain image 224 is performed by the NSEM 726.

At step 912, the size range parameter 310 is obtained. According to some embodiments, the NSEM 106 obtains the size range parameter as:

$$S = f\left(\frac{N_{positive}}{N_{negative}}\right)$$

where $N_{positive}$ is total number of positive stained pixels in the positive stain image 224 below a predetermined positive threshold, $N_{negative}$ is total number of negative stained pixels in the negative stain image 226 below a predetermined positive threshold, and f(x) is a function proportional to the value of x, where x denotes the input parameter of the function f( ). The method 900 then terminates at step 914.

Figure 10:
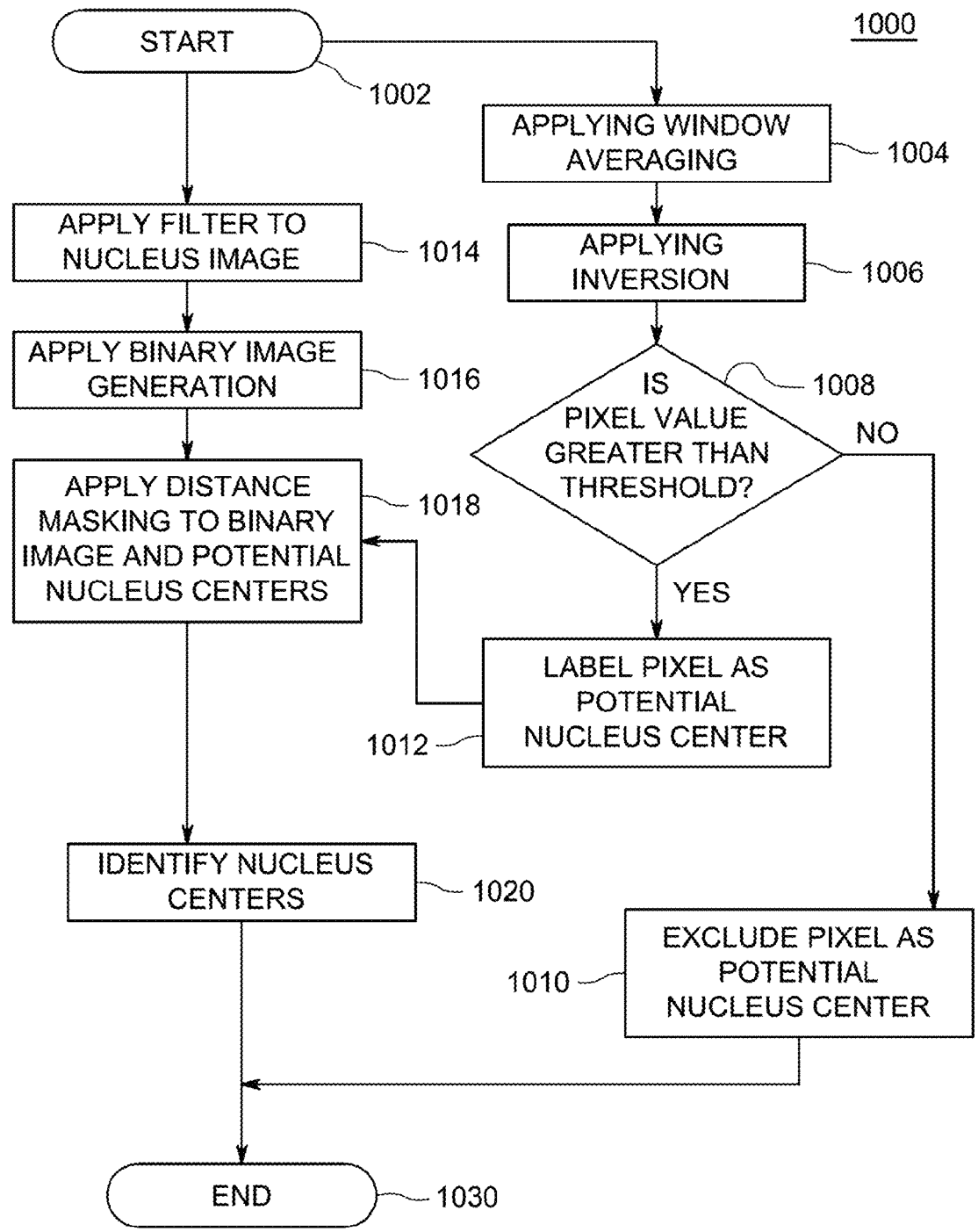
FIG. 10 is an illustration of a flow diagram for a method for identifying negative nuclei in a negative stain image according to exemplary embodiments of the present invention.

FIG. 10 is an illustration of a flow diagram for a method 1000 for identifying negative nuclei in a negative stain image according to exemplary embodiments of the present invention. The method 1000 is an implementation of the negative nucleus identification module (NNIM) 110 shown in FIG. 1, implemented as the NNIM 730 in FIG. 7 as executed by the processor 702. The method 1000 begins at step 1002 and proceeds to step 1004. Steps 1004-1012 are executed significantly in parallel to steps 1014-1016 according to one embodiment of the present invention.

First, steps 1004-1012 will be discussed. At step 1004, a window averaging procedure is applied to the negative stain image produced by the earlier stain separation, by the blob identification module 762. The pixel values obtained through the window averaging are then inverted at step 1006 and compared to a predetermined negative nucleus threshold pixel value at step 1008. If the value at the current pixel is not greater than the negative nucleus threshold value, the current pixel is excluded as a potential negative stained nucleus center at step 1010. The method then terminates at step 1030.

However, if the pixel value is greater than the negative nucleus threshold value at step 1008, the method proceeds to step 1012, where the pixel is labeled as a potential negative stained nucleus center.

In parallel, the negative stain image is filtered by the filter 406 of the distance masking module 404. The filter 406 removes low level noise from the negative stain image. At step 1016, the transform module 408 applies a binary image generation process to the negative stain image to produce a binary image.

At step 1018, the distance masking module 764 takes as input the potential negative stained nucleus centers and the binary image and applies distance masking to these inputs. The transform module 408 applies a distance transform to the binary image to find the minimum distance of each white pixel (value of 1) to any black pixel (value of 0). Once the distance transform is complete, a distance image is generated with the distance value as the pixel value. For each potential negative stained nucleus center pixel identified in the blob identification module 762, the corresponding distance value in the same location is added onto the potential negative stained nucleus center pixel to generate a new image according to the following equation:

$$P_{new}(i, j) = \begin{cases} \overline{P(i,j)} + D(i, j) & \text{if } \overline{P(i,j)} \text{ is a potential nucleus center} \\ 0 & \text{Otherwise} \end{cases}$$

Each pixel in the newly generated image is compared to its neighbors. The local maximum pixel is identified as a negative stained nucleus center. The S×S area surrounding it is identified as the negative nucleus area and output as negative nucleus identification information, and negative stained nucleus centers are identified in step 1020. The method 1000 terminates at step 1030.

Figure 11:
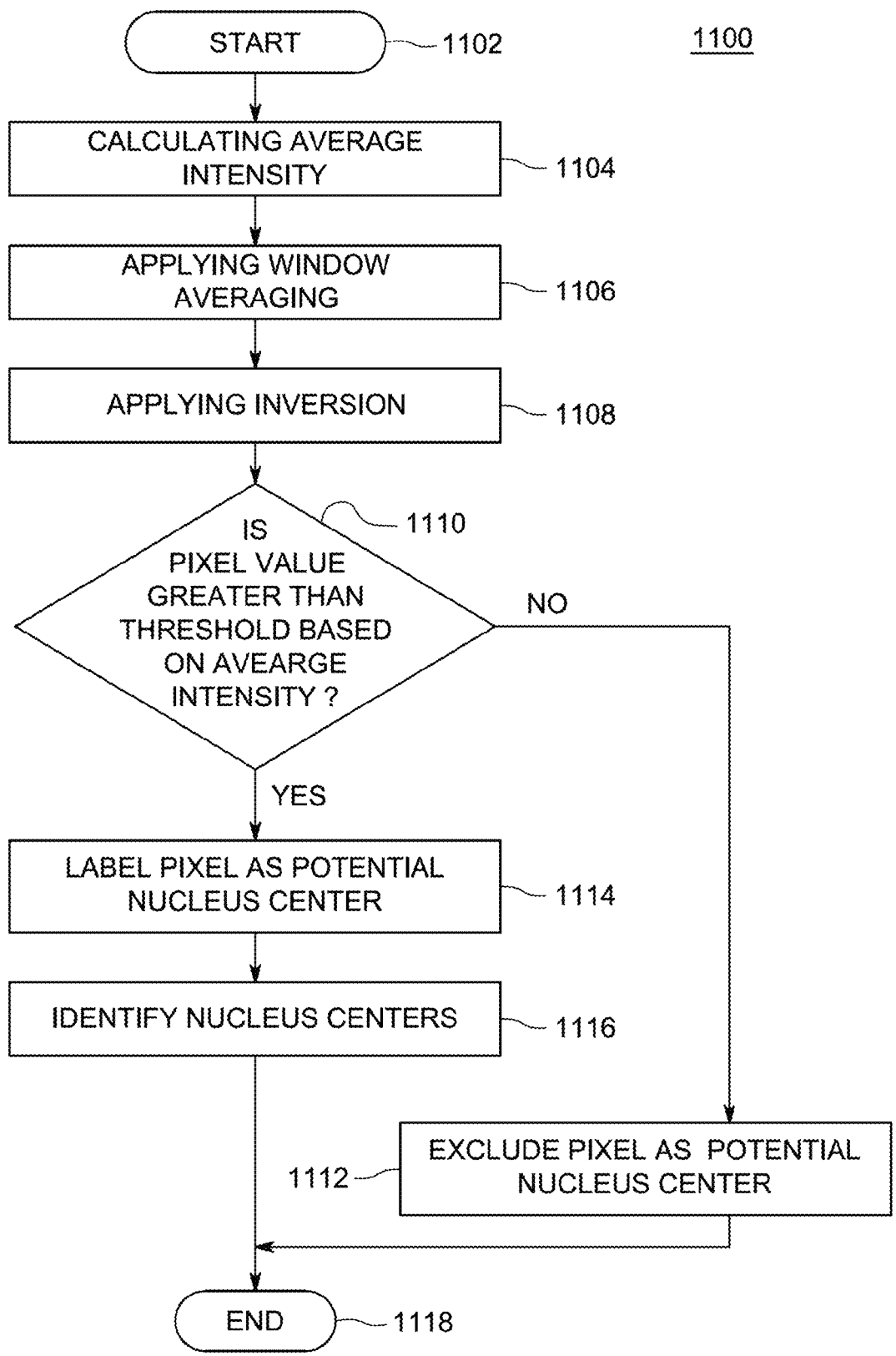
FIG. 11 is an illustration of a flow diagram for a method for identifying positive nuclei in a positive stain image according to exemplary embodiments of the present invention.

FIG. 11 is an illustration of a flow diagram for a method 1100 for positive nuclei identification in a positive stain image according to exemplary embodiments of the present invention. The method 1100 is an implementation of the positive nucleus identification module (PNIM) 108 shown in FIG. 1, implemented as the PNIM 728 in FIG. 7 as executed by the processor 702.

The method 1100 begins at step 1102 and proceeds to step 1104. At step 1104, the average intensity 510 in the positive stain image is determined by the average intensity module 772. At step 1106, a window averaging procedure is applied to the positive stain image produced by the earlier stain separation, by the blob identification module 774.

The pixel values obtained through the window averaging are then inverted at step 1108 and compared to a content adaptive positive nucleus threshold pixel value at step 1110. If the value at the current pixel is not greater than the positive nucleus threshold value, the current pixel is excluded as a potential positive stained nucleus center at step 1112. The method then terminates at 1118.

However, if the pixel value is greater than the positive nucleus threshold value at step 1110, the method proceeds to step 1114, where the pixel is labeled as a potential positive stained nucleus center. Each potential positive stained nucleus center pixel is compared to its neighbors. The local maximum pixel is identified as a positive stained nucleus center. The S×S area surrounding it is identified as the positive nucleus area and output as positive nucleus identification information, and positive stained nucleus centers are identified in step 1116. The method 1100 terminates at step 1118.

Figure 12:
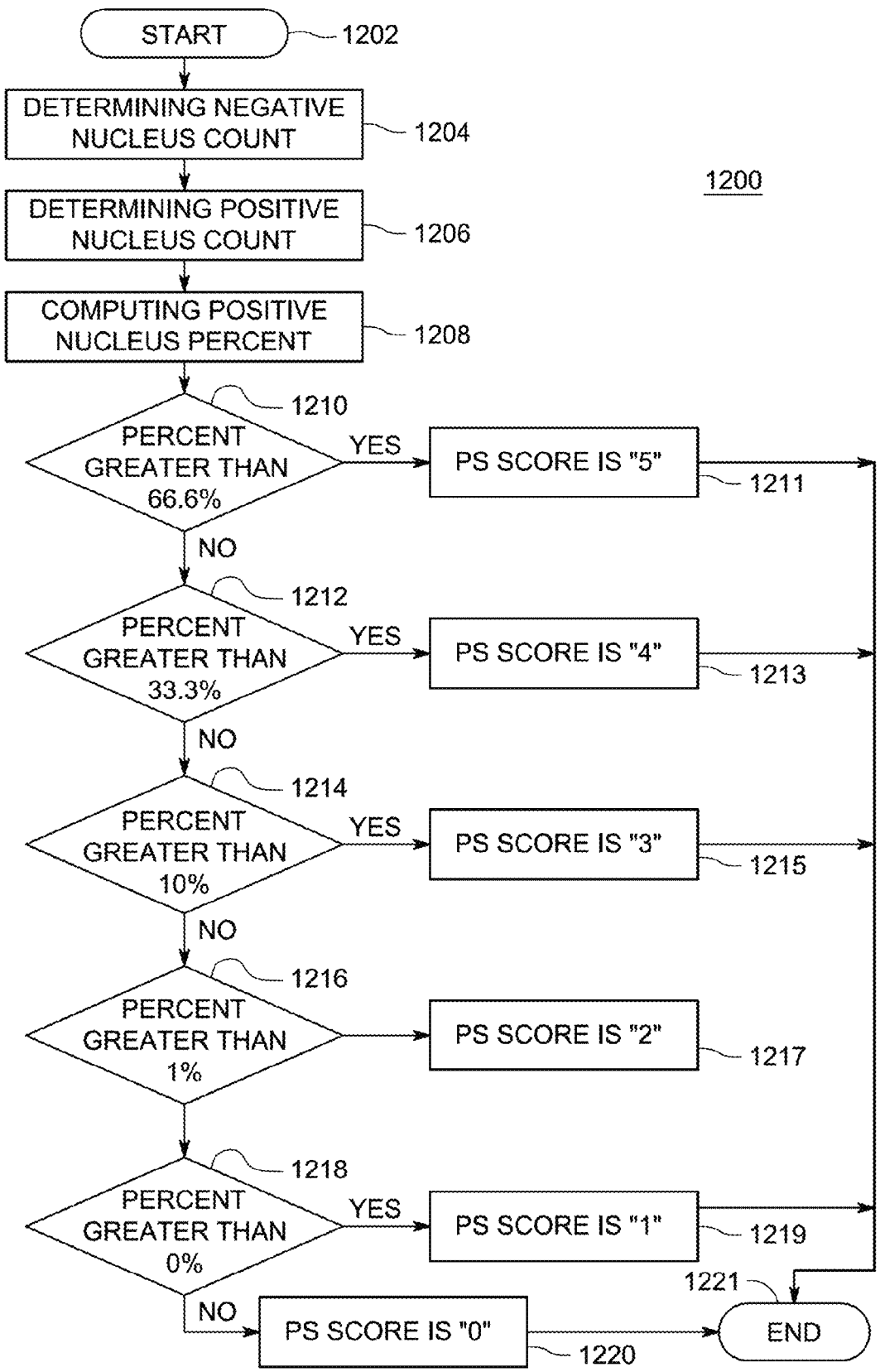
FIG. 12 is an illustration of a flow diagram for a method for determining a proportion score for a slide image according to exemplary embodiments of the present invention.

FIG. 12 is an illustration of a flow diagram for a method 1200 for determination of proportion score for a slide image according to an exemplary embodiment of the present invention. The method 1200 is an implementation of proportion scoring module 112 shown in FIG. 1, implemented as the proportion scoring module 732 in FIG. 7 as executed by the processor 702. The method begins at step 1202 and proceeds to step 1204.

At step 1204, the proportion scoring module 732 determines a negative nucleus count according to the negative nucleus identification information 410 received from the NNIM 730. At step 1206, the proportion scoring module 732 determines a positive nucleus count according to the positive nucleus identification information 520 received from the PNIM 108. At step 1208 a positive nucleus percent is computed. According to some embodiments, the positive nucleus count and the negative nucleus count is summed to obtain the total nuclei count. Then, the total nuclei count is used by the proportion scoring module 732 to compute the positive nucleus percentage.

Proportion scores (PS) are then produced by the proportion scoring module 732 based on the scoring guideline provided by the American Society of Clinical Oncology and the College of American Pathologists. According to the scoring guidelines, the PS is assigned to a slide image based on the positive nucleus to total nucleus percentage.

At step 1210, it is determined whether the positive nucleus percentage is greater than 66.6%. If the positive nucleus percentage is greater than 66.6%, a proportion score of 5 is assigned to the slide image at step 1211. If not, the method 1200 proceeds to step 1212.

At step 1212, it is determined whether the positive nucleus percentage is greater than 33.3%. If the positive nucleus percentage is greater than 33.3%, a proportion score of 4 is assigned to the slide image at step 1213. If not, the method 1200 proceeds to step 1214.

At step 1214, it is determined whether the positive nucleus percentage is greater than 10%. If the positive nucleus percentage is greater than 10%, a proportion score of 3 is assigned to the slide image at step 1215. If not, the method 1200 proceeds to step 1216.

At step 1216, it is determined whether the positive nucleus percentage is greater than 1%. If the positive nucleus percentage is greater than 1%, a proportion score of 2 is assigned to the slide image at step 1217. If not, the method 1200 proceeds to step 1218.

At step 1218, it is determined whether the positive nucleus percentage is greater than 0%. If the positive nucleus percentage is greater than 0%, a proportion score of 1 is assigned to the slide image at step 1219. If the positive nucleus percentage is not greater than 0%, a proportion score of 0 is assigned to the slide image at step 1220. The method 1200 then terminates at step 1221.

Figure 13:
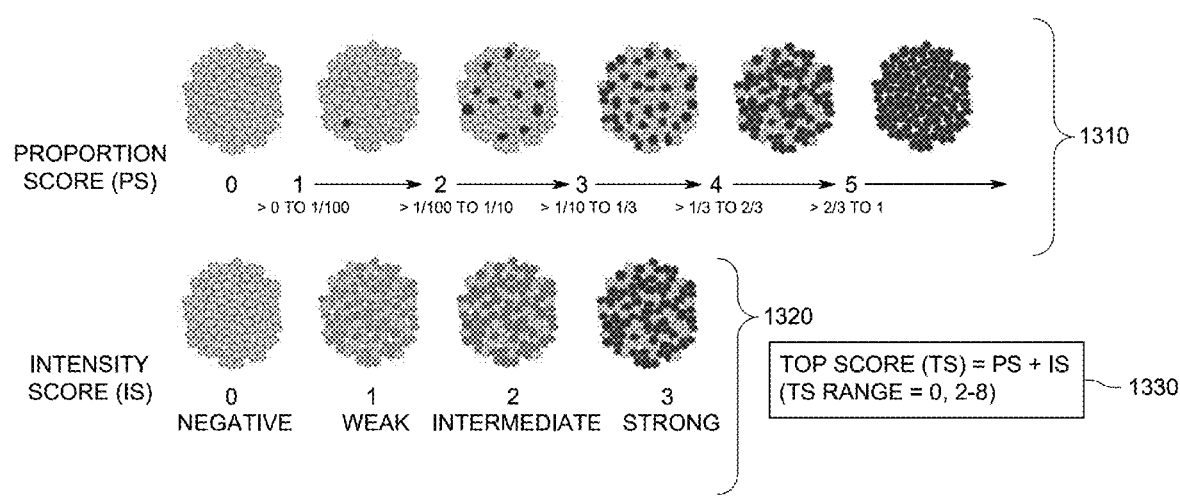
FIG. 13 is an illustration of an ER/PR score table according to exemplary embodiments of the present invention.

FIG. 13 is an illustration for determining a Total Score (TS) according to exemplary embodiments of the present invention. The TS score is computed by the scoring module 100 of FIG. 1 using a PS 1310, such as the PS obtained in the method 1200 and the average intensity 510 obtained from the intensity analysis module 502. The scoring module 100 determines an intensity score (IS) 1320 for the slide image based on the average intensity according to scoring guideline provided by the American Society of Clinical Oncology and the College of American Pathologists. The TS score is obtained by the scoring module 100 by summing the PS and IS as depicted FIG. 13.

Accordingly, the present invention may be realized in hardware, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A non-transitory computer-readable storage medium storing one or more computer programs adapted to cause a processor based system to execute steps comprising:
   converting at least a part of image information of a tissue sample to an optical domain image;
   separating the at least a part of image information into positive stain image information and negative stain image information;
   identifying a number of positive stained nuclei based on the positive stain image information and a number of negative stained nuclei based on the negative stain image information;
   calculating a number of total nuclei by summing the number of positive stained nuclei and the number of negative stained nuclei, wherein a percentage score is calculated based on the number of positive stained nuclei and the number of total nuclei; and
   displaying an indication of a cancer diagnosis score derived at least in part from the percentage score.

2. The non-transitory computer-readable storage medium of claim 1, wherein the image information includes RBG information.

3. The non-transitory computer-readable storage medium of claim 2, wherein the step of converting comprises:
   transforming the at least the part of image information from an RGB domain to an optical domain.

4. The non-transitory computer-readable storage medium of claim 1, further comprising:
   accepting one or more signals from a user input device to define a user-selected interest area within the image information of the tissue sample.

5. The non-transitory computer-readable storage medium of claim 1, wherein the step of converting comprises:
   transforming the at least the part of image information to an optical domain.

6. The non-transitory computer-readable storage medium of claim 1, wherein the step of converting comprises:
   calculating at least an optical density value for a positive stain based on the at least the part of image information.

7. The non-transitory computer-readable storage medium of claim 1, wherein the step of converting comprises:
   separating the at least the part of image information into the positive stain image information and the negative stain image information.

8. The non-transitory computer-readable storage medium of claim 7, wherein the one or more computer programs are further adapted to cause the processor based system to execute steps comprising:
   identifying a number of positive stained nuclei based on the positive stain image information and a number of negative stained nuclei based on the negative stain image information; and
   calculating a number of total nuclei by summing the number of positive stained nuclei and the number of negative stained nuclei, wherein a proportion score is calculated based on the number of positive stained nuclei and the number of total nuclei.

9. The non-transitory computer-readable storage medium of claim 1, wherein the one or more computer programs are further adapted to cause the processor based system to execute steps comprising:
   calculating a positive stained nuclei percentage based on a ratio of positive stained nuclei identified based on the positive stain image information to total nuclei included in the at least the part of image information, wherein a proportion score is calculated based on the positive stained nuclei percentage.

10. The non-transitory computer-readable storage medium of claim 9, wherein the one or more computer programs are further adapted to cause the processor based system to execute steps comprising:
    determining an average intensity of positive stain in the positive stain image information, wherein the cancer diagnosis score is determined by summing the proportion score and an intensity score identified based on the average intensity.

11. The non-transitory computer-readable storage medium of claim 10, wherein the cancer diagnosis score includes an estrogen receptor or progesterone receptor (ER/PR) score.

12. The non-transitory computer-readable storage medium of claim 9, wherein
    in a case that the positive stained nuclei percentage is more than 2/3, the proportion score is assigned to 5,
    in a case that the positive stained nuclei percentage is more than 2/1, the proportion score is assigned to 4,
    in a case that the positive stained nuclei percentage is more than 10%, the proportion score is assigned to 3,
    in a case that the positive stained nuclei percentage is more than 1%, the proportion score is assigned to 2, and
    in a case that the positive stained nuclei percentage is more than 0%, the proportion score is assigned to 1.

13. The non-transitory computer-readable storage medium of claim 2, wherein the one or more computer programs are further adapted to cause the processor based system to execute steps comprising:
    selecting a salient region of the image information as the at least the part of image information by finding a region which is rich in both red and blue channels.

14. The non-transitory computer-readable storage medium of claim 8, wherein the positive stain image information and the negative stain image information are analyzed to obtain a size range parameter based on a proportion of positive stained pixels with pixel intensity below a predetermined positive threshold and negative stained pixels with pixel intensity below a predetermined negative threshold.

15. The non-transitory computer-readable storage medium of claim 14, wherein the step of identifying the number of negative stained nuclei comprises:
  applying a window averaging procedure to each pixel in the negative stain image information based on the size range parameter;
  applying an inverse process on each pixel to obtain an inverse pixel and assigning the pixel value to the inverse pixel value;
  determining a pixel to be a nucleus center if the pixel value is greater than a predetermined negative nucleus threshold; and
  excluding a pixel as a negative stained nucleus center if the pixel value is equal or less than the predetermined negative nucleus threshold.

16. The non-transitory computer-readable storage medium of claim 15, wherein the step of applying the inverse process further comprises:
  receiving as an input a window averaging of the intensity of the pixels of each of the positive and negative stain image information.

17. The non-transitory computer-readable storage medium of claim 14, wherein the step of identifying the number of negative stained nuclei comprises:
  filtering the negative stain image information using a low pass filter to generate a filtered negative stain image information;
  applying a binary image generation process on each pixel of the filtered negative stain image information to produce a binary image information;
  applying a distance transform to the binary image information to find a minimum distance between white and black pixels by generating a distance image information with the minimum distance as a pixel value; and
  generating a new image information where each pixel value is the sum of the value at a center pixel of the negative stained nucleus and distance image pixel.

18. The non-transitory computer-readable storage medium of claim 14, wherein the step of identifying the number of positive stained nuclei comprises:
  applying a window averaging procedure to each pixel in the positive stain image information based on the size range parameter;
  applying an inverse process on each pixel to obtain an inverse pixel and assigning the pixel value to the inverse pixel value
  determining a pixel to be a nucleus center when the pixel value is greater than a positive nucleus threshold; and
  excluding a pixel as a nucleus center when the pixel value is equal or less than the positive nucleus threshold.

19. The non-transitory computer-readable storage medium of claim 18, wherein the positive nucleus threshold is based on an average intensity of positive stain.

\* \* \* \* \*

UNITED STATES PATENT AND TRADEMARK OFFICE
CERTIFICATE OF CORRECTION

PATENT NO. : 9,652,844 B2
APPLICATION NO. : 14/661641
DATED : May 16, 2017
INVENTOR(S) : Ming-Chang Liu et al.

Page 1 of 1

It is certified that error appears in the above-identified patent and that said Letters Patent is hereby corrected as shown below:

In the Claims

Column 11 Line 53: AFTER "includes" DELETE "RBG" and INSERT -- RGB --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*